United States Patent
Vanerio et al.

(10) Patent No.: US 12,384,111 B2
(45) Date of Patent: Aug. 12, 2025

(54) DEVICE AND METHOD FOR FEEDING POLYMERIC MATERIAL TO A PRINTHEAD OF AN ADDITIVE MANUFACTURING MACHINE AND ADDITIVE MANUFACTURING MACHINE

(71) Applicant: CARACOL S.R.L., Lomazzo (IT)

(72) Inventors: Daniele Vanerio, Lomazzo (IT); Paolo Cassis, Lomazzo (IT); Giovanni Avallone, Lomazzo (IT)

(73) Assignee: CARACOL S.R.L., Lomazzo (IT)

( * ) Notice: Subject to any disclaimer, the term of this patent is extended or adjusted under 35 U.S.C. 154(b) by 0 days.

(21) Appl. No.: 17/857,369

(22) Filed: Jul. 5, 2022

(65) Prior Publication Data

US 2023/0311417 A1  Oct. 5, 2023

(30) Foreign Application Priority Data

Apr. 4, 2022  (IT) .................. 102022000006644

(51) Int. Cl.
| | |
|---|---|
| *B29C 64/321* | (2017.01) |
| *B29C 64/209* | (2017.01) |
| *B29C 64/227* | (2017.01) |
| *B33Y 30/00* | (2015.01) |
| *B33Y 40/00* | (2020.01) |

(52) U.S. Cl.
CPC .......... *B29C 64/321* (2017.08); *B29C 64/209* (2017.08); *B29C 64/227* (2017.08); *B33Y 30/00* (2014.12); *B33Y 40/00* (2014.12)

(58) Field of Classification Search
CPC ... B29C 64/321; B29C 64/209; B29C 64/227; B33Y 30/00; B33Y 40/00
See application file for complete search history.

(56) References Cited

U.S. PATENT DOCUMENTS

| | | | | |
|---|---|---|---|---|
| 3,118,184 | A * | 1/1964 | Swenson ............... | B29C 45/541 222/254 |
| 3,572,647 | A * | 3/1971 | Staheli .................... | B29B 7/845 415/72 |
| 5,992,772 | A * | 11/1999 | Hibner .................... | B05B 5/047 406/142 |
| 2004/0265419 | A1* | 12/2004 | Wohlrab ............... | B29C 45/542 425/561 |
| 2016/0263822 | A1* | 9/2016 | Boyd, IV ................ | B32B 27/00 |

(Continued)

FOREIGN PATENT DOCUMENTS

| | | | | |
|---|---|---|---|---|
| DE | 102016220496 | | 4/2018 | |
| JP | H07246053 | A * | 9/1995 | ............. A21C 11/16 |
| WO | 2011092269 | | 8/2011 | |

OTHER PUBLICATIONS

Machine translation of JP H07246053 A (Year: 1995).*

(Continued)

*Primary Examiner* — Galen H Hauth
*Assistant Examiner* — John Robitaille
(74) *Attorney, Agent, or Firm* — KLINTWORTH & ROZENBLAT LLP

(57) ABSTRACT

A feeding device for feeding a polymeric material to a print head of an additive manufacturing machine has a feed cylinder that flows directly into the print head at a fitting to feed the polymeric material into the print head; and a movable pusher within the feed cylinder to advance the polymeric material towards the print head.

14 Claims, 3 Drawing Sheets

(56) References Cited

U.S. PATENT DOCUMENTS

2017/0291344 A1* 10/2017 Maxson ................. B29C 48/21
2018/0043612 A1    2/2018 Gray et al.
2019/0047225 A1    2/2019 Luo
2019/0366628 A1* 12/2019 Guillory ............... B29C 64/106
2020/0122392 A1*  4/2020 Townsend ............ B29C 64/364

OTHER PUBLICATIONS

Machine translation of JP H07246053 A to Kobayashi, published Sep. 26, 1995 (Year: 1995).*

Italian Search Report and Written Opinion issued in connection with Italian Application No. 202200006644 dated Nov. 16, 2022 (8 pages).

* cited by examiner

DEVICE AND METHOD FOR FEEDING POLYMERIC MATERIAL TO A PRINTHEAD OF AN ADDITIVE MANUFACTURING MACHINE AND ADDITIVE MANUFACTURING MACHINE

CROSS-REFERENCE TO RELATED APPLICATIONS

This patent application claims priority from Italian patent application No. 102022000006644 filed on Apr. 4, 2022, the entire disclosure of which is incorporated herein by reference.

FIELD OF THE ART

The present invention relates to a device for feeding a polymeric material to a print head of an additive manufacturing or three-dimensional printing machine for polymers, technopolymers and composite materials.

Additive manufacturing is used to make products and semi-finished products, even large ones, that require lightness, strength and have complex geometries such as, for example, bodies and frames in the nautical, aeronautical and automotive industries, machinery components and architectural structures.

STATE OF THE ART

Three-dimensional printing involves manufacturing items by means of an additive manufacturing process from a digital three-dimensional model file, designed by means of a CAD modelling system.

The present invention relates, in particular, to three-dimensional printing using Fused Deposition Model (FDM) or Fused Filament Fabrication (FFF) technology, which is based on the use of a print head provided with an extruder having a nozzle from which a molten polymer material exits. The molten polymer material exiting the extrusion nozzle is laid down in layers on a work plane, according to a predefined three-dimensional pattern. Once laid down by the extruder, the layer of polymer material solidifies immediately and bonds to an adjacent layer of material. The sequence of overlapping layers thus forms a single solid structure or final article of desired shape.

The nozzle having circular cross-section determines the formation of porosity in the cross-section of the products and the reduction of the contact surface between successive layers. Porosity leads to a reduction in the mechanical properties of components made with this technology.

To overcome this drawback, the Applicant has conceived an extruder provided with a nozzle with a polygonal cross-section, in particular rectangular, and wherein the extruder can be selectively oriented so as to arrange the layers to increase the adhesion surface between the layers by reducing the gaps as shown in Patent Application IT102018000010225 belonging to the Applicant.

A print head generally comprises an extruder, which in turn comprises a cylindrical body, a nozzle arranged at the free end of the cylindrical body, heating elements associated with the cylindrical body to heat the cylindrical body, an extrusion screw to advance and melt the polymeric material in the cylindrical body and eject the molten polymeric material through the nozzle.

Generally, the polymeric material is fed to the print head in a granular or flake state or as pellets via a feeding device comprising at least a hopper and a duct connecting the hopper to the print head.

Generally, the advancement of the polymeric material relies on gravity or augers as shown in document KR 2016/0107769 where an auger is arranged within the duct to advance the polymeric material towards an inlet port of the print head.

Feeding devices of the known type have proven unable to guarantee feeding of the polymeric material to print heads operating at any angular orientation to produce large, complex geometry products.

OBJECT OF THE INVENTION

The aim of the present invention is to make a feeding device that mitigates the drawbacks of the prior art.

In accordance with the present invention, a feeding device for feeding a polymeric material to a print head of an additive manufacturing machine is made; the feeding device (4) comprising:
  a feed cylinder that flows directly into the print head at a fitting to feed the polymeric material into the print head; and
  a movable pusher within the feed cylinder for advancing and pushing the polymeric material towards the print head.

In this motion, the polymer material is fed to the print head irrespective of the action of gravity, and the machine is able to operate even without gravity.

In particular, the pusher is a selectively movable piston of alternating motion within the feed cylinder.

The piston feeding is of the discontinuous type but ensures feeding under all operating conditions and print head positions.

The feed cylinder advantageously comprises a ventilation opening in proximity of said fitting.

Since air is present between the polymer particles, the compression exerted by the pusher also compresses the air, which is ejected through the suction port. In addition, air is sucked in through the suction port when the pusher is retracted.

In particular, the feeding device includes a filter arranged at said ventilation opening.

Thanks to the filter, any dust in the feed cylinder is retained during the air ejection step and does not contaminate the print area.

Specifically, the feeding device includes an actuator to actuate the pusher in alternating motion, and the feed cylinder comprises a feed opening to allow a polymeric material to be fed into the feed cylinder.

In this way, the feed cylinder is fed when the pusher is arranged in the retracted position.

The feeding device comprises an additional fitting arranged at the feed opening to allow polymeric material to be fed to the feed cylinder.

In particular, the feeding device comprises a storage container configured to contain and dispense polymeric material; a pneumatic device; and a tube, in particular a hose, to pneumatically transfer the polymeric material from the storage container to said feed cylinder.

In this way, the feeding to the feed cylinder is also independent of the action of gravity.

One aim of the present invention is to make an additive manufacturing machine that is free from the drawbacks of the prior art.

In accordance with the present invention, an additive manufacturing machine is provided, the machine comprising a print head for molding polymeric material comprising a cylindrical body, a nozzle at one end of the cylindrical body, and an extrusion screw selectively rotatable within the cylindrical body for melting and advancing the polymeric material in a given direction towards the nozzle; and at least one feeding device as claimed in any one of the preceding claims and wherein the feed cylinder is connected to the cylindrical body.

In this way, the machine is able to produce very complex and large objects where the print head can be fed in any position and even without gravity.

In accordance with an embodiment of the present invention, the machine comprises two feeding devices arranged symmetrically from opposite sides of the cylindrical body and wherein two feed cylinders are connected to the cylindrical body.

In this way, any discontinuity in feeding the print head can be avoided.

In particular, the machine comprises a robot, in particular a robot with at least four axes, said print head being mounted at the distal end of the robot.

In this way, the print head is extremely versatile and can assume a plurality of configurations.

One aim of the present invention is to provide a method for feeding a polymeric material to a print head of an additive manufacturing machine that is free from the drawbacks of the prior art.

According to the present invention there is provided a method for feeding a polymeric material to a print head of an additive manufacturing machine, the method comprising pushing the polymeric material along a feed cylinder flowing directly into the print head at a fitting to feed the polymeric material into a cylindrical body of the print head via a pusher movable within the feed cylinder to advance the polymeric material towards the print head.

In particular, the method provides actuating the pusher of alternating motion via an actuator between a vent opening in proximity of said print head and a feed port.

DESCRIPTION OF THE DRAWINGS

Further characteristics and advantages of the present invention will become clear from the following description of non-limiting embodiments thereof, with reference to the Figures of the attached drawings, in which.

PREFERRED EMBODIMENT OF THE INVENTION

Figure 1:
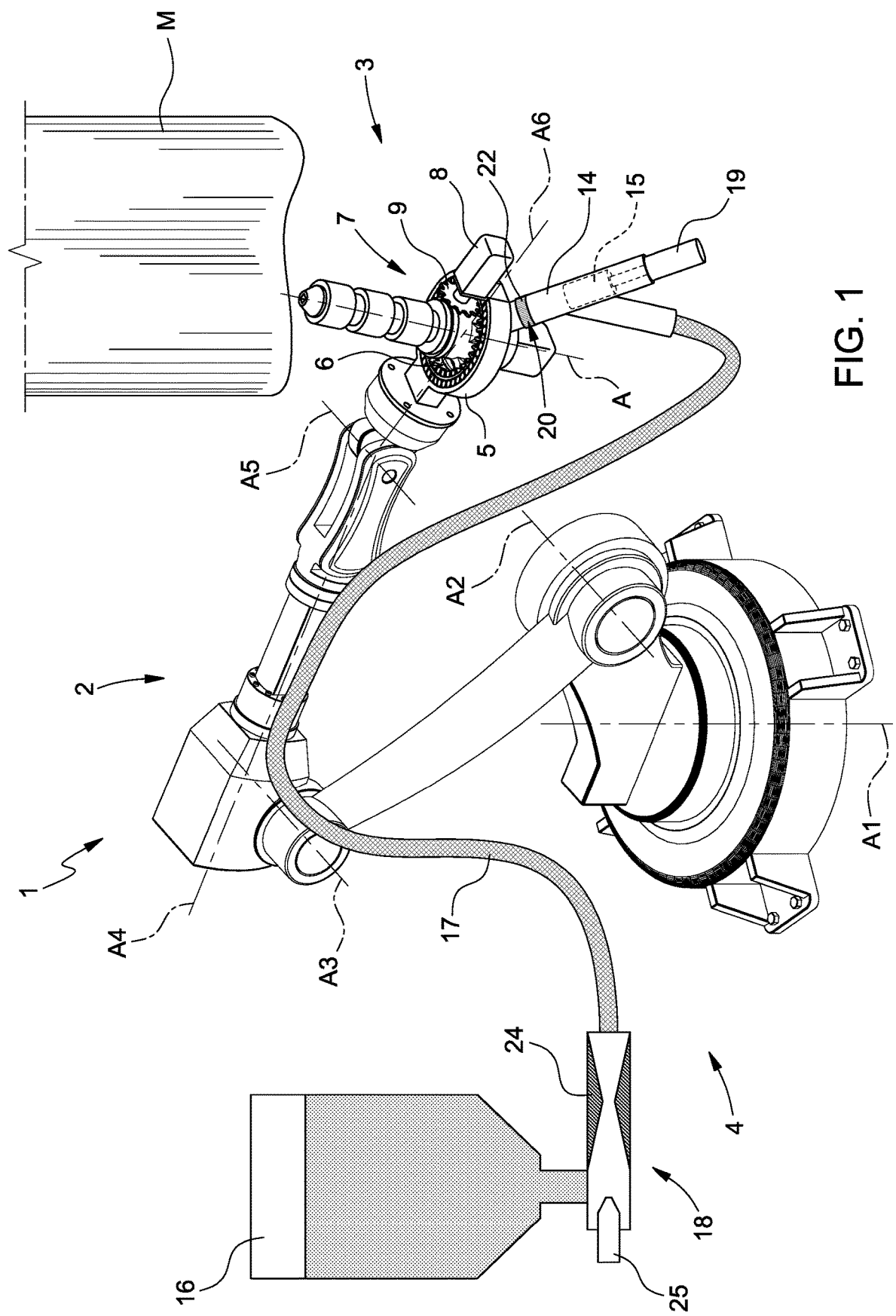
FIG. 1 is a perspective view, with parts removed for clarity's sake and parts shown schematically, of an additive manufacturing machine in accordance with the present invention.

In FIG. 1, an additive manufacturing machine is denoted by reference number 1. The machine 1 comprises a robot 2, specifically an anthropomorphic robot with six axes denoted A1, A2, A3, A4, A5, and A6; a print head 3 coupled to the distal end of the robot 2 to produce a manufactured product P using the additive manufacturing technique; and a feeding device 4 to feed a polymeric material to the print head 3.

The print head 3 comprises a connecting element 5; a bearing 6 supported by the connecting element 5; and an extruder 7, which is mounted inside the bearing 6 and extends along a longitudinal axis A coaxial to the bearing 6. In the specific case illustrated, the connecting element 5 comprises a flange connecting to the robot 2, a ring connecting to the bearing 6, and an arm extending between the flange and the ring.

The print head 3 comprises an actuator 8 and a drive element 9 to rotate the extruder 7 about its longitudinal axis A.

Figure 2:
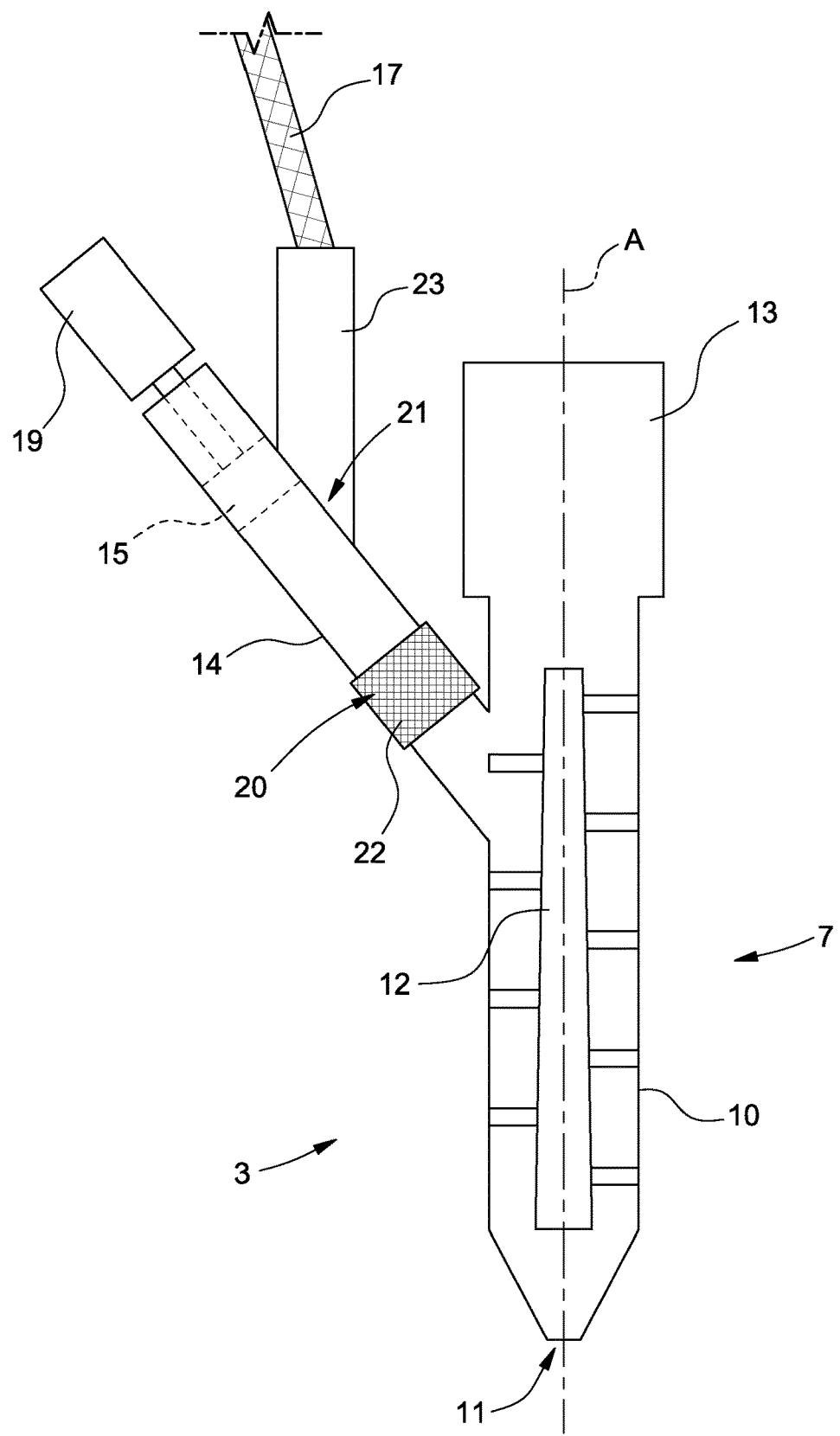
FIG. 2 is a schematic elevation view, with parts removed for clarity's sake and to an enlarged scale, of a detail of the machine of FIG. 1.

Referring to FIG. 2, the extruder 7 comprises a cylindrical body 10 extending along the longitudinal axis A and defining a melting chamber; a nozzle 11 arranged at the free end of the cylindrical body 10; an extrusion screw 12 rotatable within the cylindrical body 10 about the longitudinal axis A.

The extruder 7 also comprises heating elements associated with the cylindrical body 10 which are not shown in the attached figures and which, in this case, are electrical resistors and an actuator 13 to rotate the extrusion screw 12.

The feeding device 4 for feeding a polymeric material to the print head 3 comprises a feed cylinder 14 that flows directly into the print head 3 at a fitting; a pusher 15 movable inside the feed cylinder to advance the polymeric material towards the print head 3, in this case, into the cylindrical body 10.

The feeding device 4 further comprises a storage container 16 to contain the polymeric material; a tube 17 in this case a hose, which extends from the storage container 16 to the feed cylinder 14; and a pneumatic device 18 to transfer the polymeric material from the storage container 16 to the feed cylinder 14 along the tube 17.

The pusher 15 is a selectively movable piston of alternating motion within the feed cylinder 14. The tolerances between pusher 15 and feed cylinder 14 are very tight so that no material can pass between pusher 15 and feed cylinder 14. The feeding device 4 also comprises an actuator 19 to actuate the pusher 15 between an extended position in proximity of the print head 3 and a retracted position.

The feed cylinder 14 is attached to the print head 3 and has a ventilation opening 20 in proximity of the print head 3 and a feed opening 21 between the ventilation opening 20 and the retracted position of the pusher 15.

The feed cylinder 14 also has a filter 22 arranged above the ventilation opening 20 and a fitting 23 at the feed opening 21 to connect the tube 17 to the feed cylinder 14.

The pneumatic device 18 comprises a Venturi tube 24, which is connected to the tube 17, the storage container 16 and a nozzle 25 connected to the compressed air network to feed compressed air to the Venturi tube 24 and to drag along the tube 17 the polymeric material released from the storage container 16 into the Venturi tube 24.

The feeding device 4 comprises a control unit 26, which controls the actuation of the actuator 19 of the pusher 15 and nozzle 25 intended to feed compressed air so as to inhibit the pneumatic transport of the polymeric material when the pusher 15 is not in the retracted position.

In use, when the pusher 15 is in the retracted position, the polymer material is fed to the feed cylinder 14 via the tube 17 and the pneumatic device 18 and excess air is ejected through the ventilation opening 20 and dust particles are retained by the filter 22 so as not to pollute the print area. The filter 22 also has the function of preventing particles in the print area from entering the feed cylinder 14.

Subsequently, the pusher 15 applies a constant thrust to the material contained in the feed cylinder 14 while the air contained in the feed cylinder 14 is continuously ejected through the ventilation opening 21 until the pusher 15 is in the position of maximum extension in proximity of the ventilation opening 21. At this point, the pusher 15 is retracted and the feed cylinder 14 is once again filled with pneumatically transported polymeric material.

Figure 3:
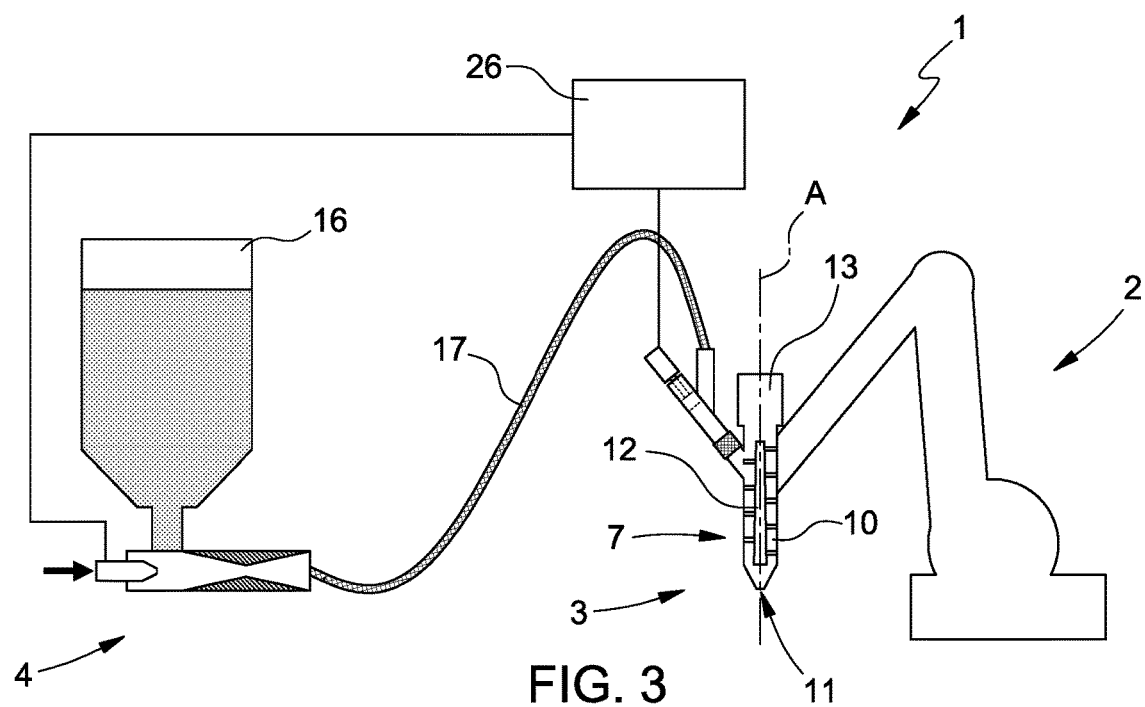
FIG. 3 is a schematic elevation view, with parts removed for clarity's sake, sections and in a reduced scale, of the machine of FIG. 1.
Figure 4:
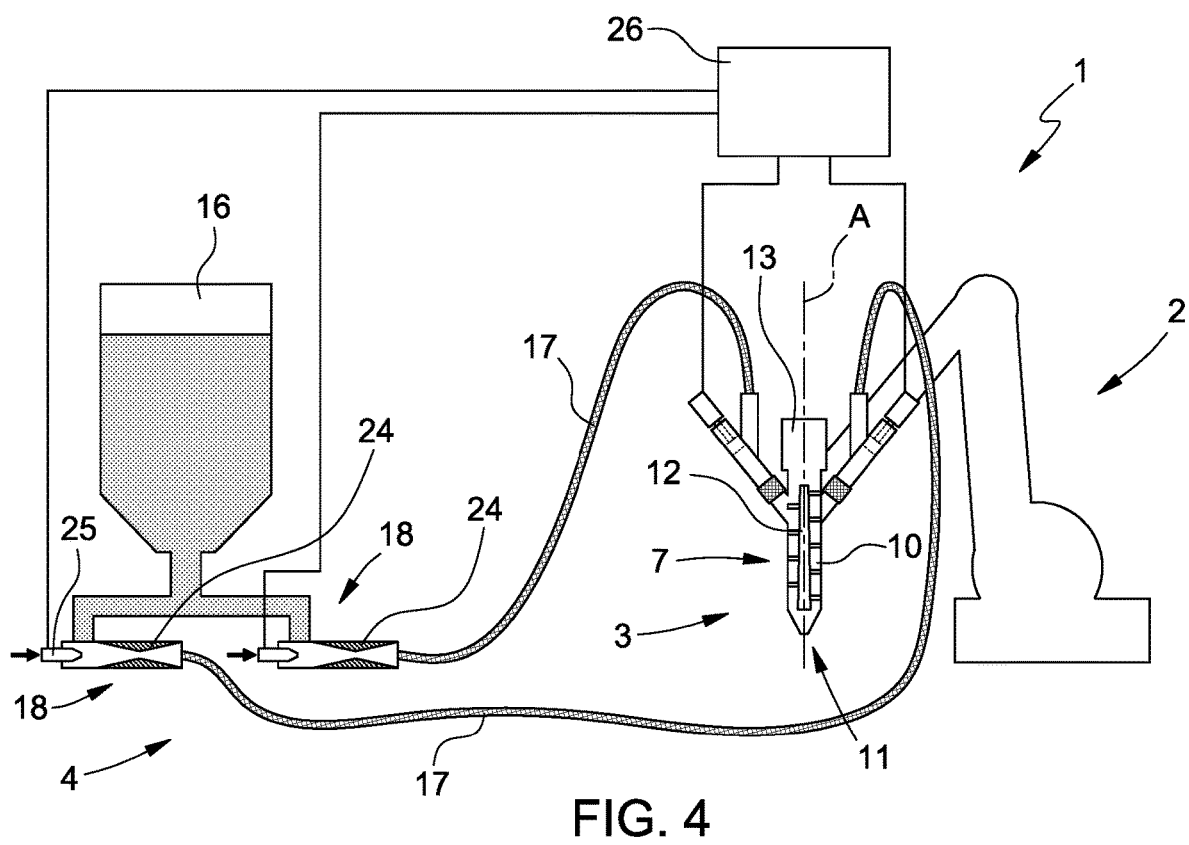
FIG. 4 is an elevation schematic view, with parts removed for clarity's sake, parts in section and in reduced scale, of an alternative embodiment of the machine of FIG. 1.

In the embodiment of FIG. 3, the additive manufacturing machine 1 comprises two feeding devices 4 for feeding a polymeric material to the print head and a single control unit 26 which manages the two feeding devices 4 in such a way as to ensure that at least one of the two pushers is always compressing and feeding the polymeric material along the respective feed cylinder 14.

Finally, it is clear that the present invention comprises further variants of the described embodiments included in the scope of protection of the appended claims.

The invention claimed is:

1. A feeding device for feeding a polymeric material in granular or flake state or as pellets to a print head of an additive manufacturing machine; the feeding device comprising:
   a robot with at least four axes, said print head being mounted at a distal end of the robot;
   a feed cylinder that flows directly into the print head at a fitting to feed the polymeric material into the print head, wherein the feed cylinder comprises a ventilation opening in fluid communication with ambient air and arranged proximate to said fitting;
   a selectively movable piston of alternating motion within the feed cylinder for advancing and pushing the polymeric material towards the print head; and
   the feed cylinder comprising a feed opening between the ventilation opening and the retracted position of the piston;
   a storage container configured to contain and dispense polymeric material;
   a pneumatic device; and
   a hose for pneumatically transferring the polymeric material from the storage container to said feed opening of the feed cylinder.

2. The feeding device as claimed in claim 1, and comprising a filter arranged at said ventilation opening.

3. The feeding device as claimed in claim 1, and comprising an actuator for alternately driving the piston.

4. The feeding device as claimed in claim 1, wherein the feed cylinder comprises a feed opening for allowing polymeric material to be fed into the feed cylinder.

5. The feeding device as claimed in claim 4, and comprising a further attachment arranged at the feeding opening to allow feeding polymeric material to the feeding cylinder.

6. An additive manufacturing machine, the machine comprising:
   a print head for molding polymeric material comprising a cylindrical body;
   a nozzle at one end of the cylindrical body, and an extrusion screw selectively rotatable within the cylindrical body for melting and advancing the polymeric material in a given direction towards the nozzle;
   a robot with at least four axes, said print head being mounted at a distal end of the robot; and
   at least one feeding device for feeding the polymeric material in granular or flake state or as pellets to the print head; the feeding device comprising:
   a feed cylinder that flows directly into the print head at a fitting to feed the polymeric material into the print head and comprises a ventilation opening in communication with ambient air and arranged proximate to said fitting; and
   a selectively movable piston of alternating motion within the feed cylinder for advancing and pushing the polymeric material toward the print head;
   the feed cylinder comprising a feed opening between the ventilation opening and the retracted position of the piston;
   a storage container configured to contain and dispense polymeric material;
   a pneumatic device; and
   a hose for pneumatically transferring the polymeric material from the storage container to said feed opening of the feed cylinder.

7. The machine as claimed in claim 6, and comprising two feeding devices arranged symmetrically from opposite sides with respect to the cylindrical body and wherein two feeding cylinders are connected to the cylindrical body.

8. The machine as claimed in claim 6 and comprising and actuator for actuating the piston, the pneumatic device comprising a Venturi tube, which is connected to the hose, and a nozzle connected to the compressed air network to feed compressed air to the Venturi tube and to drag along the hose the polymeric material released from the storage container into the Venturi tube.

9. The machine as claimed in claim 8 and comprising a control unit, which controls the actuation of the actuator of the piston and the nozzle intended to feed compressed air so as to inhibit the pneumatic transport of the polymeric material when the piston is not in the retracted position.

10. The machine as claimed in claim 6, wherein the print head comprises a connecting element; a bearing supported by the connecting element; and an extruder, which is mounted inside the bearing and extends along a longitudinal axis A coaxial to the bearing, the connecting element comprises a flange connecting to the robot, a ring connecting to the bearing, and an arm extending between the flange and the ring.

11. The machine as claimed in claim 10, wherein the print head comprises an actuator and a drive element to rotate the extruder about its longitudinal axis.

12. A method of feeding polymeric material in granular or flake state or as pellets using the feeding device of claim 1, the method comprising:
   pushing the polymeric material along a feed cylinder flowing directly into the print head at a fitting to feed the polymeric material into a cylindrical body of the print head via a piston of alternating motion movable within the feed cylinder to advance the polymeric material towards the print head, wherein the feed cylinder comprises a ventilation opening in fluid communication with ambient air and arranged proximate to said fitting; and
   pneumatically transferring the polymeric material from a storage container via a hose to a feed opening of the feed cylinder,
   wherein the storage container is configured to contain and dispense the polymeric material and the feed opening of the feed cylinder is between the ventilation opening and the retracted position of the piston.

13. The method as claimed in claim 12 and comprising actuating the piston of alternating motion via an actuator between a vent opening in proximity of said print head and a feed port.

14. The method as claimed in claim 12, and comprising pneumatically transferring polymeric material from a storage container to the feed cylinder via a tube and a pneumatic device.

* * * * *